United States Patent Office 3,326,754
Patented June 20, 1967

3,326,754
METHOD OF RELIEVING GASTROINTESTINAL DISTRESS WITH TRIBUTYL PHOSPHATE
Samuel Prussin and Elly T. Margolis, Los Angeles, Calif., assignors to Rexall Drug and Chemical Company, Los Angeles, Calif., a corporation of Delaware
No Drawing. Filed June 10, 1965, Ser. No. 463,007
1 Claim. (Cl. 167—55)

This invention relates to a therapeutic composition for oral administration, and more particularly to a therapeutically active composition and method for alleviation of the flatulence and distress that commonly accompany intestinal diseases or disorders which are associated with or produce gas.

There are a number of diseases of the gastrointestinal tract which are associated with, or produce, intestinal gas such as functional bowel distress, spastic cholitis, hiatus hernia, pyloro-spasm, splenic flexure syndrome, aerophagia, cholelithiasis, diverticulitis, atrophic gastritis and gas associated with pregnancy to mention but a few. In addition, the entrapment and accumulation of gas in the gastrointestinal tract can at times prove to be dangerous, as in the patient suffering from coronary thrombosis. Also, post-operative gas pain is common after surgical procedures in the abdominal region such as for hernia, appendicitis, Caesarean section and such similar operations. It is important, therefore, that positively acting medicaments be available to alleviate the discomfort and pain that is incident to such conditions as hereinabove described.

It is an object of this invention to provide an orally administrable therapeutic composition containing an agent capable of preventing the accumulation of gas in the gastrointestinal tract.

Another object of the invention is to provide a therapeutic composition containing an agent capable of relieving the flatulence and pain caused where gas has already accumulated in the gastrointestinal tract.

Still another object of the invention is to provide an orally administrable defoaming and anti-gas agent that is compatible with other medicinal agents employed in the treatment of diseases of the gastrointestinal tract and may be administered in admixtures therewith.

Still other objects will become apparent to those skilled in the art in the light of the following description.

The invention sought to be patented in its process of use aspect resides in a method of treating gastorintestinal distress comprising the oral administration of tributyl phosphate.

The invention sought to be patented, in its first product composition aspect, resides in the concept of a composition comprising about 0.25 to about 25% by weight of tributyl phosphate in an inert pharmaceutically acceptable carrier.

The invention sought to be patented in its second product composition aspect resides in the concept of a composition comprising about 0.25% to about 25% by weight of tributyl phosphate uniformly distributed in a carrier comprising an antacid composition.

In accordance with the process of use aspect of this invention, tributyl phosphate is administered orally to a subject in an amount sufficient to achieve relief from gastrointestinal distress. The dosage required will depend upon the age and weight of the subject and the severity of the condition being treated and will be determined by the physician. Normally, an amount of about 5 to about 200 milligrams of tributyl phosphate for each dose will be administered.

Tributyl phosphate, unlike the organopolysiloxanes commonly used as anti-gas remedies, is partially miscible with water and, accordingly, does not require admixture with carriers or other particulate supporting matter to achieve effective distribution of the defoaming agent within the gastrointestinal tract. In addition to the limited solubility in water of tributyl phosphate, which assures distribution under conditions wherein organopolysiloxanes will not disperse, the specific gravity of this anti-foaming agent is lower than that of water, so that, as saturation, it is possible for monomolecular films to form at air-water interfaces which results in the bursting of the bubbles comprising the foam of froth. Moreover, the absence of both color and odor from pharmaceutically acceptable tributyl phosphate is an aid to user acceptance.

While admixture with solid carriers or other drugs is not required for effective distribution of the tributyl phosphate in the gastrointestinal tract, it is often desirable to administer tributyl phosphate in combination with pharmaceutically acceptable carriers and particularly with carriers comprising medicinal agents that are useful for alleviating the hyperacidity that is frequently an accompaniment to gas producing ailments. In such cases the tributyl phosphate is desirably administered in admixture with, for example, such substances known as gastric antacids and demulcents, including aluminum hydroxide, magnesium carbonate, magnesium trisilicate, sodium bicarbonate, calcium caseinate, magnesium oxide, calcium carbonate, sodium carboxymethylcellulose, aluminum aminoacetate, calcium phosphate, aluminum trisilicate, magnesium phosphate, bismuth subcarbonate, aluminum phosphate, di-hydroxy aluminum aminoacetate and potassium phosphate. Any of these antacid and demulcent substances may be effectively used in admixture as carriers for the tributyl phosphate anti-gas agent in the preparation of compositions according to this invention. When so used, the solid carrier, in a finely divided state, is intimately mixed, in accordance with conventional pharmaceutical practice, with the tributyl phosphate. Preferably, the proportions of the ingredients will be such that the ultimate mixture remains discrete and fluent, and of a granular character suitable for direct administration or for compression into tablet form. Such a mixture may then be compressed into tablet form, with or without therapeutically inert filler materials such as cane sugar, milk sugar, talc, or the like, and with or without suitable non-toxic binder substances.

It is also convenient to adminster the tributyl phosphate in admixture with one or more of the carriers hereinabove described along with various flavors, preservatives, sweeteners and the like, in the form of an aqueous suspension.

It may also, on occasion, be desirable to employ, along with the tributyl phosphate intestinal medications other than antacid substances, such as, for example, atropine, sulfonamides, adsorbents etc.

Since tributyl phosphate is readily soluble in alcohol it can also be conveniently administered in the form of an elixir.

Some specific examples of the ingredients and the proportions thereof, in compositions containing tributyl phosphate, are given below; but it is to be understood these are intended to illustrate and not limit.

The following examples illustrate tablet formulations:

Example 1

| | Mg. |
|---|---|
| Tributyl phosphate | 25 |
| Calcium silicate | 100 |
| Fumed silica | 25 |
| Dicalcium phosphate | 500 |
| Acacia | 7 |
| Starch | 35 |
| Magnesium stearate | 7 |

Example 2

| | |
|---|---|
| Tributyl phosphate | 100 |
| Calcium silicate | 200 |
| Fumed silica | 50 |
| Dicalcium phosphate | 250 |
| Acacia | 7 |
| Starch | 35 |
| Magnesium stearate | 7 |

The following examples illustrate compositions in wafer form:

Example 3

| | Mg. |
|---|---|
| Tributyl phosphate | 25 |
| Aluminum hydroxide, dried gel | 300 |
| Magnesium hydroxide | 300 |
| Fumed silica | 25 |
| Sugar | 500 |
| Acacia | 12 |
| Magnesium stearate | 12 |
| Flavors | Q.s. |

Example 4

| | |
|---|---|
| Tributyl phosphate | 100 |
| Aluminum hydroxide, dried gel | 300 |
| Magnesium hydroxide | 300 |
| Fumed silica | 100 |
| Sugar | 500 |
| Acacia | 12 |
| Magnesium stearate | 12 |
| Flavors | Q.s. |

The following example illustrates a composition in the form of an elixir wherein the tributyl phosphate is administered in a liquid medium.

Example 5

Elixir containing in each 0.6 ml.:

| | |
|---|---|
| Tributyl phosphate, mg. | 50 |
| Alcohol | Q.s. |

The following example illustrates a therapeutic composition in liquid form wherein the tributyl phosphate is contained in a suspension of gastric antacid materials.

Example 6

Suspension containing in each 5 ml. dose:

| | Mg. |
|---|---|
| Tributyl phosphate | 25 |
| Aluminum hydroxide (dried gel equivalent) | 200 |
| Magnesium hydroxide | 200 |
| Methocel | 75 |
| Preservatives. | |
| Flavors and sweeteners | Q.s. |
| Purified water. | |

The subject matter which the applicants regard as their invention is particularly pointed out and distinctly claimed as follows.

We claim:

A method of treating gastro-intestinal distress in a subject suffering from the same which comprises the oral administration to said subject of about 5 to about 200 milligrams of tributyl phosphate.

References Cited

FOREIGN PATENTS 639,057   3/1962   Canada.

OTHER REFERENCES

"Condensed Chemical Dictionary," Reinhold, New York (1961), p. 1159.

ALBERT T. MEYERS, *Primary Examiner.*

JULIAN S. LEVITT, *Examiner.*

SHELDON J. SINGER, *Assistant Examiner.*